(12) United States Patent
Kim

(10) Patent No.: US 6,590,630 B2
(45) Date of Patent: Jul. 8, 2003

(54) LIQUID CRYSTAL DISPLAY HAVING HOLE IN PASSIVATION LAYER EXPOSING THE DATA LINE AND METHOD OF FABRICATING THE SAME

(75) Inventor: Jong-Sung Kim, Edmonton (CA)

(73) Assignee: LG.Philips LCD Co., Ltd., Seoul (KR)

( * ) Notice: Subject to any disclaimer, the term of this patent is extended or adjusted under 35 U.S.C. 154(b) by 15 days.

(21) Appl. No.: 09/783,143

(22) Filed: Feb. 15, 2001

(65) Prior Publication Data

US 2002/0044229 A1 Apr. 18, 2002

(30) Foreign Application Priority Data

Feb. 16, 2000 (KR) .......................................... 2000-7385

(51) Int. Cl.[7] ............................................. G02F 1/1343
(52) U.S. Cl. ......................... 349/192; 349/54; 349/122; 349/138
(58) Field of Search ............................ 349/54, 55, 192, 349/122, 138

(56) References Cited

U.S. PATENT DOCUMENTS

| | | | | |
|---|---|---|---|---|
| 5,546,207 A | * | 8/1996 | Kim ............................ | 349/122 |
| 5,929,947 A | * | 7/1999 | Tani ............................. | 349/42 |
| 5,963,279 A | * | 10/1999 | Taguchi ....................... | 349/122 |
| 5,994,721 A | * | 11/1999 | Zhong et al. ................ | 257/440 |
| 6,191,832 B1 | * | 2/2001 | Nakakura .................... | 349/52 |
| 6,392,720 B1 | * | 5/2002 | Kim ............................ | 349/139 |
| 6,414,729 B1 | * | 7/2002 | Akiyama et al. ........... | 349/141 |

* cited by examiner

Primary Examiner—Robert H. Kim
Assistant Examiner—Andrew Schechter
(74) Attorney, Agent, or Firm—Morgan, Lewis & Bockius LLP

(57) ABSTRACT

The present invention discloses a thin film transistor liquid crystal display and a method of fabricating the same. More specifically, a liquid crystal display includes the first and second substrates, a gate line, a data line, and a thin film transistor on the first substrate, a passivation layer on the thin film transistor and the gate line, wherein a data line hole is formed in the passivation layer, thereby exposing a portion the data line, a pixel electrode on the passivation layer, a common electrode on the second substrate, and a liquid crystal layer between the first and second substrates.

14 Claims, 6 Drawing Sheets

LIQUID CRYSTAL DISPLAY HAVING HOLE IN PASSIVATION LAYER EXPOSING THE DATA LINE AND METHOD OF FABRICATING THE SAME

This application claims the benefit of Korean Patent Application No. 200-7385, filed on Feb. 16, 2000, which is hereby incorporated by reference.

BACKGROUND OF THE INVENTION

1. Field of the Invention

The present invention relates to a liquid crystal display, and more particularly, to a thin film transistor liquid crystal device and a method of fabricating the same. Although the present invention is suitable for a wide scope of applications, it is particularly suitable for easily detecting a short line defect, thereby increasing yield in fabricating a liquid crystal display.

2. Discussion of the Related Art

A liquid crystal display (LCD) has been widely used in office automation equipment and video units because it has advantages in size and power consumption. Such an LCD typically utilizes an optical anisotropy of a liquid crystal (LC). The LC has thin and long shape molecules, which causes an orientation alignment of the LC molecules. Therefore, an alignment direction of the LC molecules are be controlled by applying electric fields to the LC molecules. When the alignment direction of the LC molecules are properly adjusted, the LC is aligned and light is reflected along the alignment direction of the LC molecules in displaying image data.

An active matrix (AM) LCD having a plurality of thin film transistors (TFTs) and pixel electrodes arranged in the shape of an array matrix draws most attention because of its high resolution and superiority in displaying moving pictures. The active matrix type liquid crystal display device, employing a TFT as a switching device, is formed on an array substrate having a matrix array of TFTs and pixel electrodes, and an opposing substrate arranged opposing the TFT substrate, with a liquid crystal material interposed therein. The opposing substrate includes a light-shielding film (so called a black matrix), a color filter and a common electrodes.

Now, referring to the attached drawings, a conventional back-channel-etching type structure of an array substrate of the liquid crystal display device manufactured by a conventional method is explained in detail. As shown in FIG. 1, a liquid crystal display 20 includes an array substrate 2, a color filter substrate 4 facing into the array substrate 2, a liquid crystal 10 interposed between the array and color filter substrates 2 and 4, and a sealant 6 formed at the periphery of the gap between the two substrates 2 and 4. The sealant 6 prevents the liquid crystal 10 from leaking out of the liquid crystal display device 20.

The array substrate 2 includes a substrate 1, a thin film transistor "S" as a switching element for changing an orientation of the liquid crystal 10, and a pixel electrode 14 as a first electrode for applying electric fields to the liquid crystal 10. The color filter substrate 4 includes another substrate 1, a color filter 8 for displaying colors, and a common electrode 12 as a second electrode for applying electric fields to the liquid crystal 10. A pixel region "P" includes the pixel electrode 14 and serves as a display area for displaying images.

Referring to FIG. 2, a detailed description of the structure and operation of the array substrate 2 will be followed. On the substrate 1, a gate line 22 is transversely formed with a data line 24 arranged perpendicular thereto, and a pixel electrode 14 is formed on the area defined by the gate and data lines 22 and 24. Near the cross point between the gate and data lines 22 and 24, a portion of the gate line 22 is used as a gate electrode 26. Further, near the cross point between the gate and data lines 22 and 24, a source electrode 28 is protruded from the data line 24 spaced apart from the source electrode 28 and a drain electrode 30 is formed. The TFT "S" includes the gate electrode 26, the source electrode 28, and the drain electrode 30 as well as an active layer 55, which usually serves as the most important element to switch the liquid crystal layer (reference numeral 10 of FIG. 1). Since it is easy to form an amorphous silicon layer at a relatively low temperature such as below 350° C., amorphous silicon is conventionally used for the active layer 55.

While not shown in FIG. 2, data pads and gate pads are respectively formed at each end of the data lines and gate lines. The data and gate pads (not shown) electrically connect the TFT "S" and the pixel electrode 14 with corresponding external driving circuits (not shown), respectively. The TFT "S" serves as a switching device to apply signals for the pixel electrode 14.

Still referring to FIG. 2, a drain contact hole 34 is formed over the drain electrode 30. The pixel electrode 14 (shown in FIG. 1) electrically contacts the drain electrode 30 through the drain contact hole 34. A capacitor electrode 21 is integrally formed with the gate line 22, and overlaps the pixel electrode 14 to form a storage capacitor Cst. The storage capacitor Cst serves to store electric charges.

As explained previously, the TFT "S" including the gate, source, and drain electrodes 26, 28 and 30 acts as a switch for applying electric fields to the liquid crystal 10 (shown in FIG. 1). That is a say, in operation, if only signals are applied to the gate electrode 26 of the TFT "S", the electric fields are applied to the pixel electrode 14. The signals applied to the TFT "S" are transmitted from an outer circuit (not shown), which is electrically connected with the data and gate pads (not shown).

A fabricating process of the above-mentioned array substrate requires repeated steps of depositing and patterning of various layers. The patterning step adopts a photolithography mask step including light exposing with a mask. Since one cycle of the photolithography step is facilitated with one mask, the number of masks used in the fabrication process is a critical factor in determining the number of patterning steps. As the fabricating process for the array substrate becomes simpler, errors may decrease. The fabricating process for the array substrate is set out according to design specifications for the array substrate or materials used for the various layers in the array substrate. For example, in case of fabricating a large-scaled (12 inches or larger) LCD, a specific resistance of a material for the gate lines serves as a critical factor in determining the quality of the LCD. Therefore, a highly conductive metal such as aluminum (Al) or aluminum alloys are usually used for the large scaled LCD device.

Referring now to FIGS. 3A to 3E, a fabrication method and a more detailed description of the structure of the TFT and the storage capacitor will be discussed as follows. For the TFT, an inverted staggered type is widely employed due to its advantages of a simple structure and a superior quality. The inverted staggered tube TFT is divided into a back-channel-etch type and an etching-stopper type according to a method of forming a channel in the TFT. The back-channel-etch type has a simpler structure. FIGS. 3A to 3E refer to the back-channel-etch type TFT.

At first, a glass substrate 1 is cleaned to remove particles or contaminants on the surface of the substrate 1. Then, as shown in FIG. 3A, a first metal layer is deposited on the substrate 1 and patterned by lithography to form the gate electrode 26, the gate line (reference numeral 22 of FIG. 2), and the capacitor electrode 21. Aluminum is widely used for the gate electrode 26 to decrease a RC delay. However, a pure aluminum is chemically weak and may involve an occurrence of a hillock in a high-temperature process. Therefore, aluminum alloys or a layered aluminum is used for the gate electrode instead of a pure aluminum.

Next, as shown in FIG. 3B, a gate insulating layer 5C is formed on the substrate 1 to cover the first patterned metal layer including the gate electrode 26 and the capacitor electrode 21. Thereafter, an amorphous silicon layer 52 (a-Si:H) and a doped amorphous silicon layer 54 (n+a-Si:H) are sequentially formed on the gate insulating layer 50. The silicon layers 52 and 54 are patterned to form the active layer 55. The doped amorphous silicon 54 serves as an ohmic contact layer to decrease a contact resistance measured between the active layer 55 and a metal layer that will be formed in a later step.

Next, as shown in FIG. 3C, a metal layer is deposited and patterned to form the source and drain electrodes 28 and 30. At this point, the data line 24 is integrally formed with the source electrode 28. Thereafter, using the source and drain electrodes 28 and 30 as masks, a portion of the doped amorphous layer 54, an ohmic contact layer, is etched to form a channel "CH" between the source and drain electrodes 28 and 30. Unless the ohmic contact layer between the source and drain electrodes 28 and 30 is etched, a critical problem may occur in an electrical characteristic of the TFT (reference "S" of FIG. 2).

However, since there is no etching selectively between the ohmic contact layer 54 and the amorphous silicon layer 52, it should be very careful in etching the ohmic contact layer 54 between the source and drain electrodes 28 and 30. Actually, about 50 nm of the amorphous silicon layer 52 is further etched in forming the channel "CH" between the source and drain electrodes 28 and 30. The characteristic of the TFT "S" directly depends on an etching uniformity of the over-etched portion in the amorphous silicon layer 52.

Next, as shown in FIG. 3O, an insulating layer is deposited and patterned to form a passivation layer 56, which serves to protect the active layer 55. The passivation layer 56 includes an inorganic material such as silicon oxide ($SiO_2$) or an organic material such as benzocyclobutene (BCB). Those materials have high light-transmittance, water-resistance, and good reliability, which are requirements for the passivation layer 56. In addition, a drain contact hole 34 is formed in the passivation layer 56 to expose a portion of the drain contact hole 30.

Next, as shown in FIG. 3E, a transparent conductive material is deposited and patterned to form the pixel electrode 14. Indium tin oxide (ITO) is usually used for the pixel electrode 14. The pixel electrode 14 electrically contacts the drain electrode 30 through the drain contact hole 34.

FIG. 4 shows the above-described fabricating process as a flow chart. In step 200, the substrate is cleaned in order to remove particles or contaminants on the surface of the substrate.

In step 210, depositing a first metal layer and patterning the first material layer by photolithography form the gate lines including the gate electrodes.

In step 220, a gate insulating layer, a semiconductor layer, and an ohmic contact layer are formed by depositing a first insulating material, the semiconductor material and the doped semiconductor material sequentially and patterning the semiconductor material and the doped semiconductor material. The gate insulating layer conventionally has a thickness of about 3000 Å.

In step 230, depositing and patterning a second metallic layer of chromium (Cr) or a chromium alloy form the source and drain electrodes.

In step 240, a back channel is formed by etching the ohmic contact layer using the source and drain electrodes as masks.

In step 250, depositing and patterning a second insulating layer form a passivation layer and contact holes.

In step 260, depositing and patterning a transparent conductive material form pixel electrodes.

Recently, a resolution and an aperture ratio are more important specification parameters for an LCD. However, as the resolution and the aperture ratio become higher, more errors may occur during the fabricating process for the conventional LCD. FIG. 5 illustrates an example of such errors.

FIG. 5 is a cross-sectional view taken along the line V—V' in FIG. 2. As shown, the data line 24 is formed on the gate insulating layer 50, which is formed on the substrate 1. After a passivation layer 56 is formed to cover the data line 24, a metal layer used for the pixel electrodes 14 and 16 is deposited on the passivation layer 56. A metal layer is patterned to form the pixel electrodes 14 and 16 with the data line 24 centered under the boundary area between the pixel electrodes 14 and 16. At this point, to achieve a high resolution and a high aperture ratio, gaps between the pixel electrodes 14 and 16 must be designed to be very minute. Since the above-mentioned gaps are too minute to be properly patterned, a defected pattern 13 may be left between the pixel electrodes 14 and 16 during the patterning process thereof. The defect pattern 13 results in a short circuit between the different pixel electrodes 14 and 16, which causes a point defect of the LCD.

The above-mentioned point defect due to the short circuit between the pixel electrodes is difficult to detect during a patterning examination because the pixel electrode 14 and 16 are very thin and transparent. For example, an ITO of about a 500 Å thickness is used for the pixel electrode. Further, no electrical method for precisely detecting the point defect has been developed by now.

FIG. 6 is a graph illustrating a capacitance characteristic of the conventional pixel electrode when an electric signal is applied to the gate and source electrodes of the TFT. When a gate signal "Vg" and a display signal "Vd" are respectively applied to the gate and source electrodes at the same time, the display signal "Vd" transmits through the drain electrode and the pixel electrode and is stored therein until another gate signal is applied to the gate electrode. Therefore, a pixel signal "Vp" measured from the pixel electrode should maintain its value until another gate signal is applied.

As shown in FIG. 6, a first broken line 100 is a normal pixel signal measured from a normal pixel electrode, whereas a second broken line 102 is an abnormal pixel signal measured from a defective pixel electrode. As shown, with the gate signal "Vg" applied to the gate electrode, the pixel signal "Vp" begins to increase and when the display signal "Vd" is stopped, the pixel signal "Vp" reaches its peak value, which is the same value as the display signal "Vd". In case of the normal pixel electrode, the pixel signal "Vp" maintains its value as the first broken line 100 shows. However, when a short circuit is generated between the pixel electrodes, the pixel signal "Vp" leaks to the adjacent pixel electrode. Therefore, the pixel signal "Vp" decreases by a voltage difference (ΔV) as the second broken line 102 shows.

Although there is the voltage difference (ΔV) between the normal pixel signal and the abnormal pixel signal, the voltage difference (ΔV) is too small to be detected by an electric detector. Accordingly, in spite of the above-mentioned short circuit defect, the defective array substrate is used for fabricating the LCD device, which causes a low yield in fabricating an LCD.

SUMMARY OF THE INVENTION

Accordingly, the present invention is directed to a thin film transistor liquid crystal display and method of fabricating the same that substantially obviates one or more of problems due to limitations and disadvantages of the related art.

An object of the present invention is to provide a liquid crystal display having a structure where a short circuit between pixel electrodes is easily detected.

Additional features and advantages of the invention will be set forth in the description, which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display includes the first and second substrates, a gate line, a data line, and a thin film transistor on the first substrate, a passivation layer on the thin film transistor and the gate line, wherein a data line hole is formed in the passivation layer, thereby exposing a portion the data line, a pixel electrode on the passivation layer, a common electrode on the second substrate, and a liquid crystal layer between the first and second substrates.

In another aspect of the present invention, a method of fabricating a liquid crystal display having first and second substrates, the method comprising the steps of forming a gate electrode on the first substrate, forming a gate line on the gate electrode including the first substrate, forming a gate insulating layer on the gate line including the first substrate, forming an active layer on the gate insulating layer, forming a data line, a source electrode, and a drain electrode on the gate insulating layer, wherein the source and drain electrodes overlap the active layer, forming a passivation layer to cover the source electrode, the drain electrode, the active layer, and the data line, forming a data line contact hole in the passivation layer, wherein the data line hole exposes a portion of the data line, and forming a pixel electrode on the passivation layer.

It is to be understood that both the foregoing general description and the following detailed description are exemplary and explanatory are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 7:
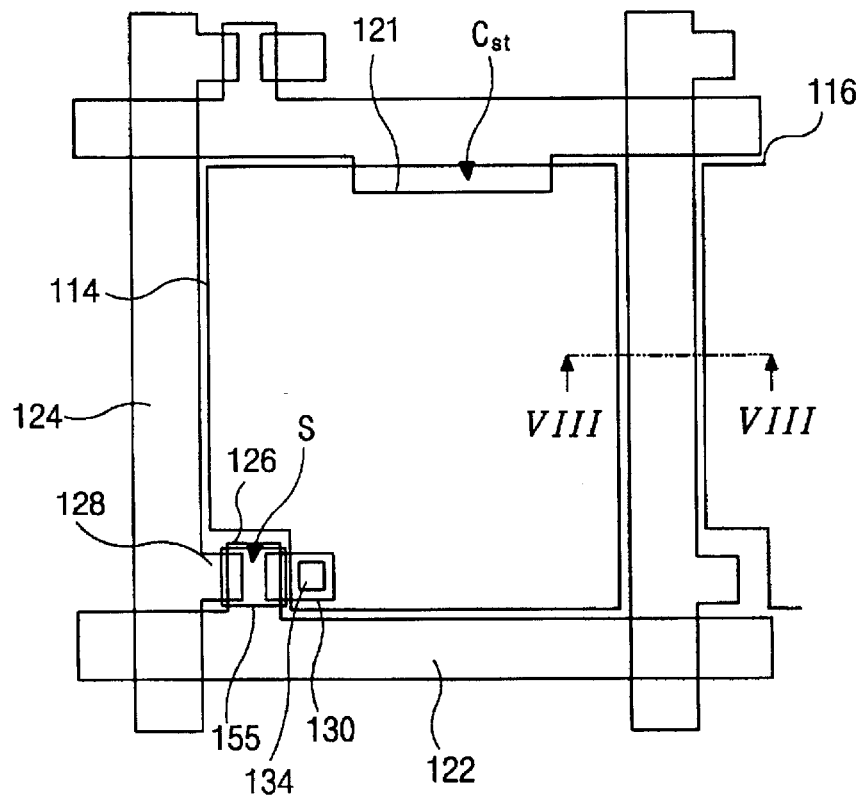
FIG. 7 is a plane view illustrating a portion of an array substrate of liquid crystal display according to a preferred embodiment of the present invention.

FIG. 7 is a plane view of an array substrate according to the preferred embodiment of the present invention. As shown, on a glass substrate 110 of FIG. 8, a gate line 122 is transversely formed with a data line 124 arranged perpendicular thereto. A pixel electrode 114 is formed on the area defined by the gate and data lines 122 and 124. Near the cross point between the gate and data lines 122 and 124, a portion of the gate line 122 is used as a gate electrode 126. Further, near the cross point between the gate and data lines 122 and 124, where a source electrode 128 is protruded from the data line 124 and spaced apart from the source electrode 128, a drain electrode 130 is formed. The TFT "S" includes the gate electrode 126, the source electrode 128, and the drain electrode 130 as well as an active layer 155.

Still referring to FIG. 7, a drain contact hole 134 is formed over the drain electrode 130. The pixel electrode 114 electrically contacts the drain electrode 130 through the drain contact hole 134. A capacitor electrode 121 is integrally formed with the gate line 122, and overlaps the pixel electrode 114 to form a storage capacitor Cst. The storage capacitor Cst serves to store electric charges.

Figure 8:
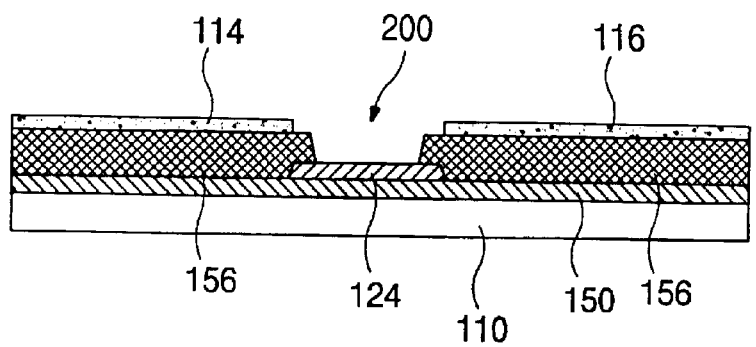
FIG. 8 is a cross-sectional view taken along the line "VIII—VIII'" of FIG. 7.

FIG. 8 is a cross-sectional view taken along the line "VIII—VIII'" of FIG. 7. As shown, on the glass substrate 110, a gate insulating layer 150 is formed thereon. A data line 124 is formed on the gate insulating layer 150 and integrally formed with the source electrode 128 (shown in FIG. 7) and the capacitor electrode 121 (shown in FIG. 7). A passivation layer 156 covers the gate insulating layer 150 and a portion of the data line 124. A data line hole 200 exposes a portion of the data line 124.

At this point, an inorganic material such as silicon oxide ($SiO_2$) or an organic material such as benzocyclobutene (BCB) is preferably used for the passivation layer 156. The inorganic or organic material is deposited and patterned to form the passivation layer 156 including the data line hole 200.

Still referring to FIG. 8, on the passivation layer 156, a first pixel electrode 114 and a second pixel electrode 116 adjacent the first pixel electrode 114 are positioned to have a gap. The pixel electrodes 114 and 116 are formed of a group consisting of indium tin oxide (ITO) and indium zinc oxide (IZO), which are transparent conductive materials. The transparent conductive material is deposited on the passivation layer 156 and patterned to form the pixel electrodes 114 and 116 to have a gap. However, since the gaps between the pixel electrodes are very minute, it is difficult to perfectly pattern the gaps. Therefore, a short circuit defect may occur between the pixel electrodes.

Figure 9:
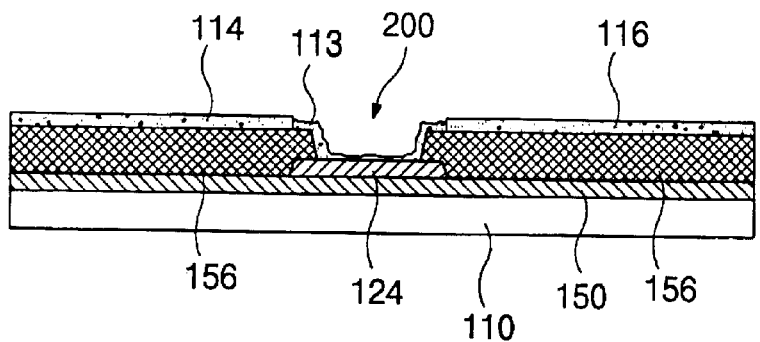
FIG. 9 illustrates no short circuit generation of the liquid crystal display device according to the preferred embodiment of the present invention.

FIG. 9 shows a cross-sectional view of the present invention when a short circuit 113 occurs between the different pixel electrodes 114 and 116. As shown, the short circuit 113 is formed across the first and second pixel electrode 114 and 116 through the data line 124. At this point, because the data line 124 is exposed by the data line hole 200, the short circuit 113 electrically connects the first and second pixel electrodes 114 and 116 with the data line 124.

When a gate signal "Vg" and a display signal "Vd" are respectively applied to the gate and source electrodes at the same time, the display signal "Vd" transmits through the drain electrode and the pixel electrode stores it until another gate signal is applied to the gate electrode. Therefore, a pixel signal "Vp" measured from the pixel electrode should maintain its value until another gate signal is applied. However, when the data line 124 electrically contacts the first or second pixel electrode 114 or 116 or both of them, electric charges stored by the pixel electrode 114 or 116 or both of them leak through the data line 124.

Figure 1:
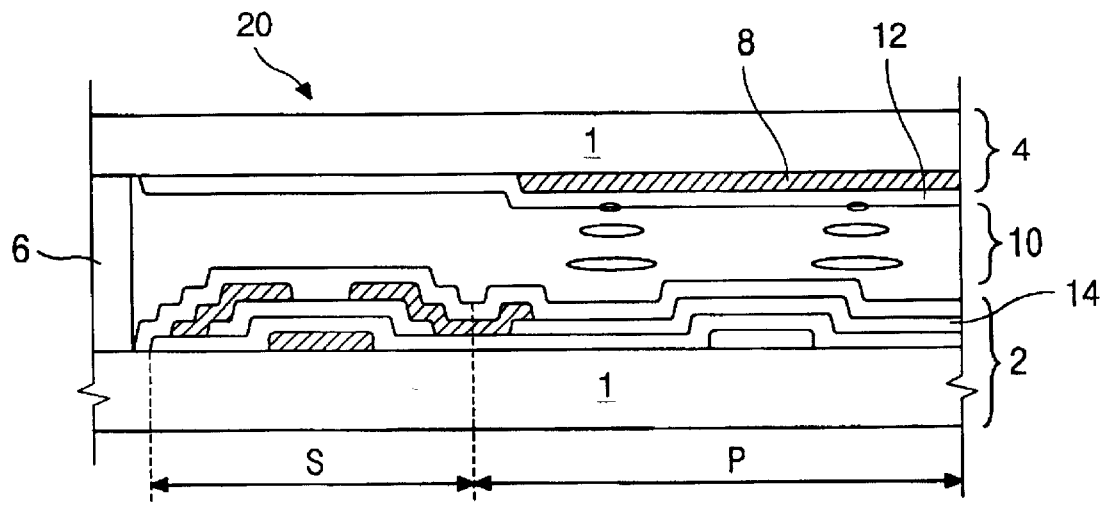
FIG. 1 is a cross-sectional view of a conventional liquid crystal display.
Figure 2:
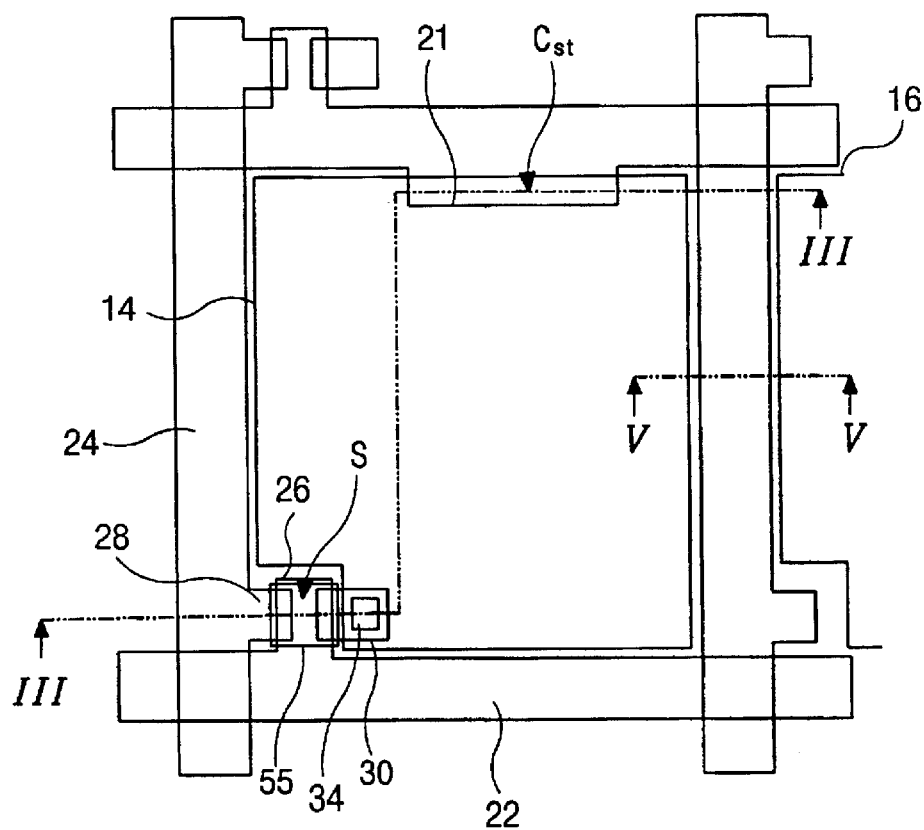
FIG. 2 is a plan view illustrating a portion of an array substrate of the conventional liquid crystal display.
Figure 3A:
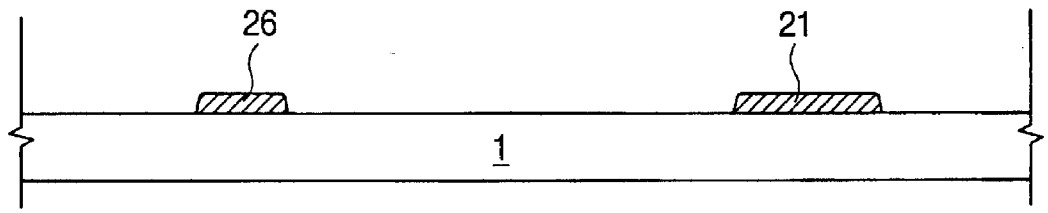
FIGS. 3A to 3E are cross-sectional views illustrating the process steps of fabricating method of the conventional liquid crystal display taken along the line "III—III'" of FIG. 2.
Figure 3B:
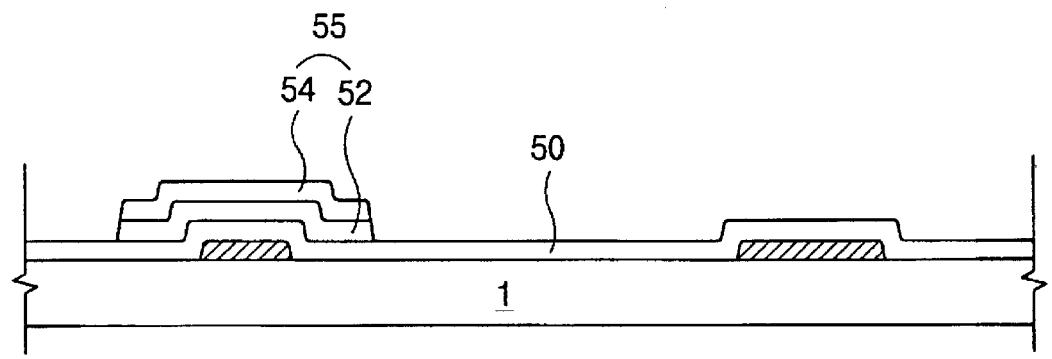
Figure 3C:
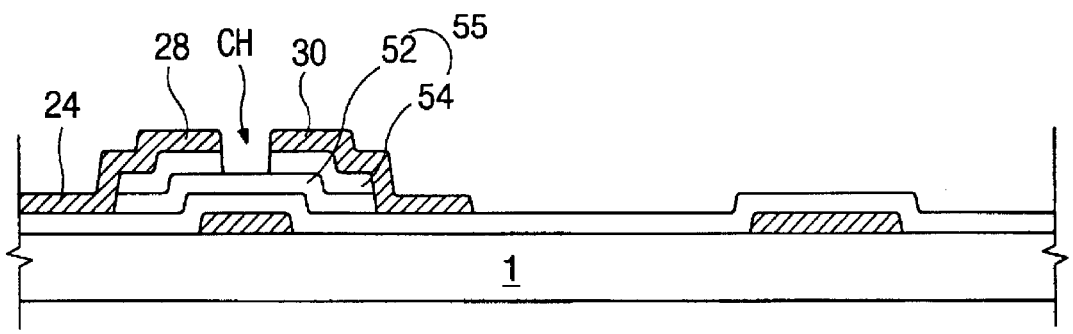
Figure 3D:
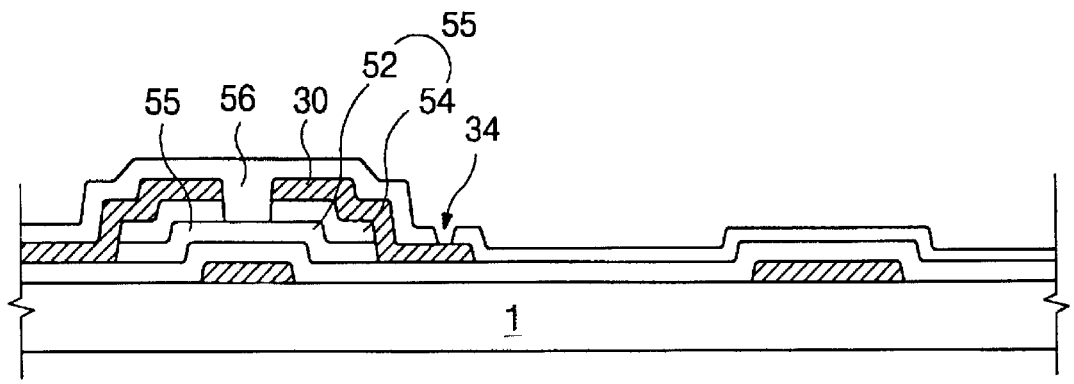
Figure 3E:
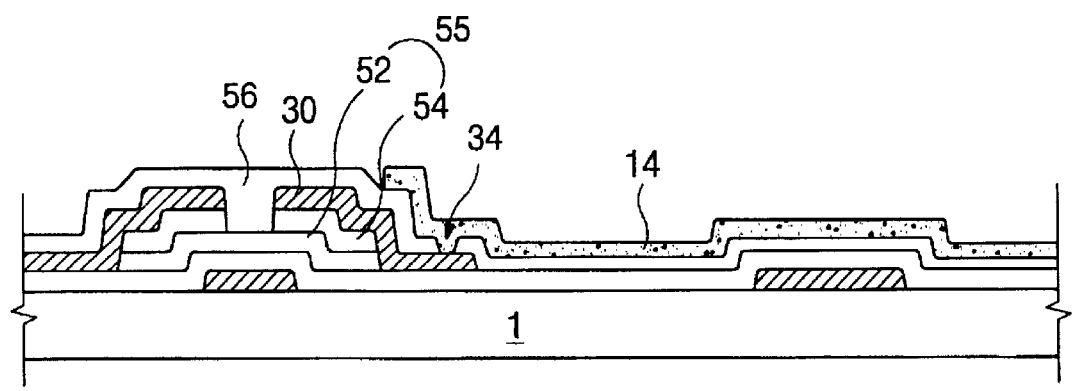
Figure 4:
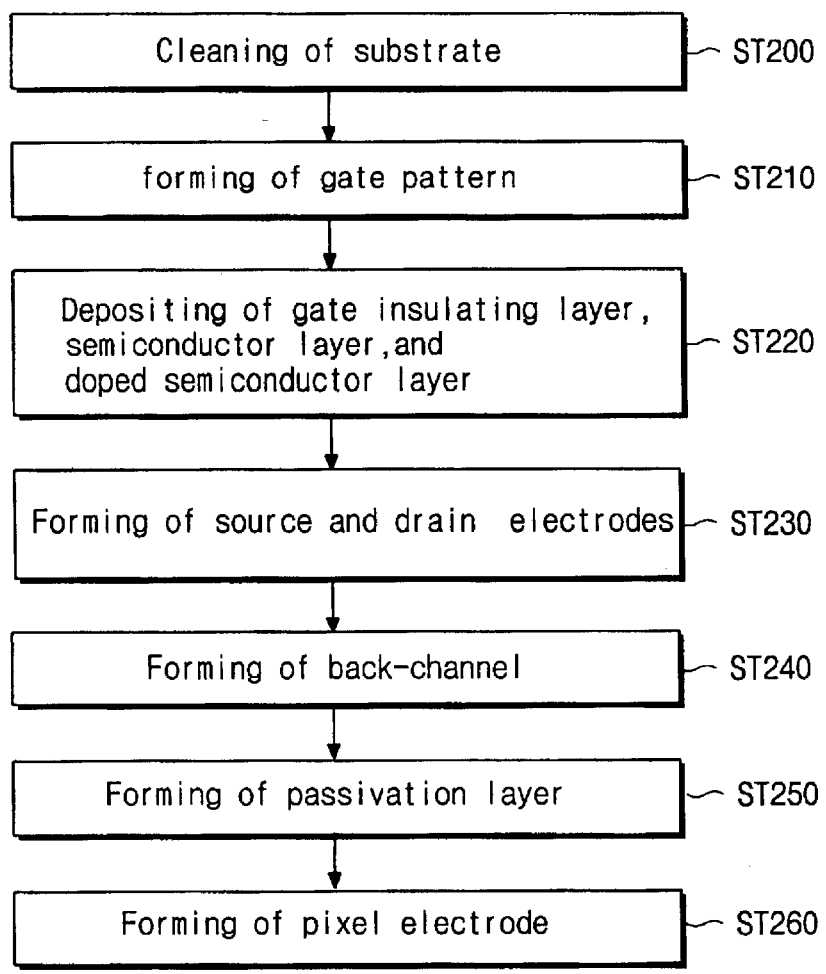
FIG. 4 is a flow chart illustrating the steps of fabricating steps of the array substrate.
Figure 5:
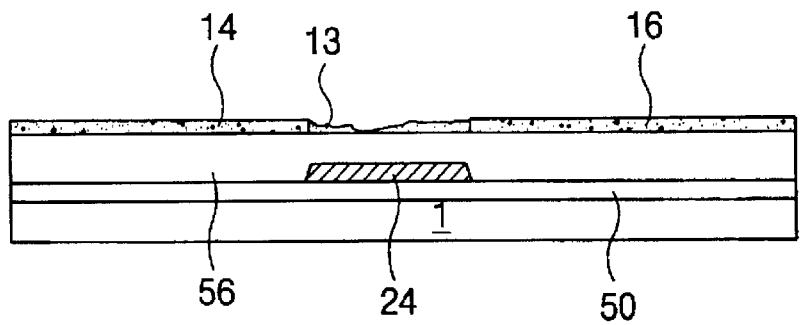
FIG. 5 is a cross-sectional view taken along a line "V—V'" of FIG. 2.
Figure 6:
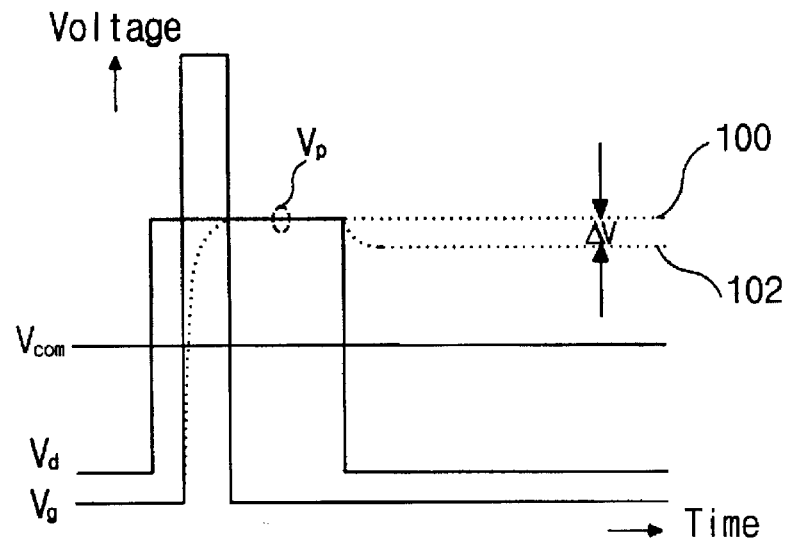
FIG. 6 is a graph illustrating a capacitance characteristic of a pixel electrode according to the conventional art.
Figure 10:
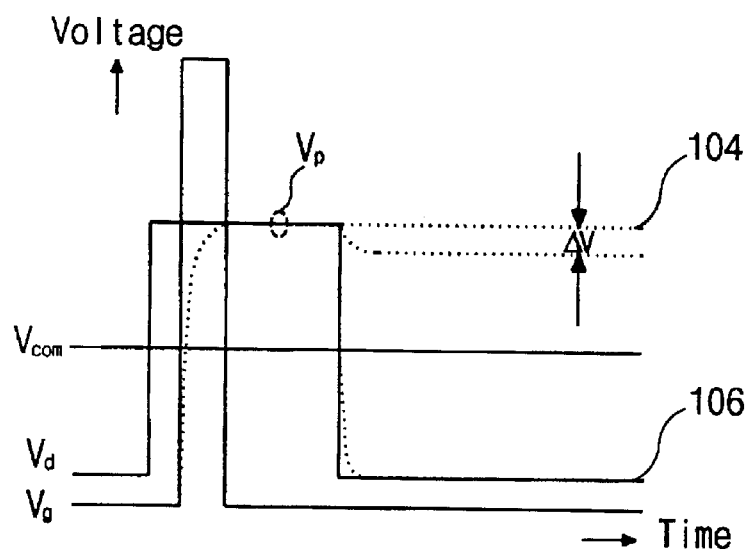
FIG. 10 is a graph illustrating a capacitance characteristic of the pixel electrode according to the preferred embodiment.

FIG. 10 shows the above-explained capacitance characteristic of the pixel electrode when the short circuit 113 is generated between the pixel electrodes. In FIG. 10, a first broken line 104 is a normal pixel signal measured from a normal pixel electrode shown in FIG. 8, whereas a second broken line 106 is an abnormal pixel signal measured from a defective pixel electrode shown in FIG. 9. A common signal "Vc" is a standard electric signal that is applied to a common electrode (reference numeral 12 of FIG. 1).

As shown, with the gate signal "Vg" applied to the gate electrode (reference numeral 126 of FIG. 7), the pixel signal "Vp" begins to increase. When the display signal "Vd" is stopped, a pixel signal "Vp" reaches its peak value, which has the same value as the display signal "Vd". In case of the normal pixel electrode shown in FIG. 8, the pixel signal "Vp" maintains its value as the first broken line 104 shows. However, when the short circuit 13 of FIG. 9 occurs between the pixel electrodes, the pixel signal "Vp" leaks to the data line 124. Therefore, the pixel signal "Vp" decreases to a first value of the display signal "Vd" as the second broken line 102 shows. As previously mentioned, the pixel signal "Vp" is the display signal "Vd", which involves image information. Therefore, if the short circuit 13 is generated as shown in FIG. 9, the pixel electrodes 114 and 116 lose their display signal "Vd" stored therein.

In the present invention, a voltage difference (ΔV) between peak values of the first and second broken lines 104 and 106 is large enough to be detected by an electric detector. Thus, a short line defect between the pixel electrodes of the LCD device according to the preferred embodiment can be easily detected by the above-mentioned method.

IT will be apparent to those skilled in the art that various modifications and variations can be made in the thin film transistor liquid crystal display and method of fabricating the same of the present invention without departing from the spirit or scope of the inventions. Thus, it is intended that present invention covers the modifications and variations of this invention provided they come within the scope of the appended claims and their equivalents.

What is claimed is:

1. A liquid crystal display, comprising:
   first and second substrates;
   a gate line, a data line, and a thin film transistor on the first substrate;
   a colorless passivation layer on the thin film transistor and the gate line, wherein a data line contact hole is formed in the passivation layer, thereby exposing a portion of the data line while forming a pixel electrode on the passivation layer;
   a common electrode on the second substrate; and
   a liquid crystal layer between the first and second substrates,
   wherein the data line contact hole is formed adjacent to a central edge portion of the pixel electrode.

2. The device of claim 1, wherein the pixel electrode is selected from a group consisting of indium tin oxide (ITO) and indium zinc oxide (IZO).

3. The device of claim 1, wherein the passivation layer includes an inorganic material.

4. The device of claim 3, wherein the inorganic material is silicon oxide ($SiO_2$).

5. The device of claim 1, wherein the passivation layer includes an organic material.

6. The device of claim 5, wherein the organic material is benzocyclobutene (BCB).

7. A liquid crystal display, comprising:
   first and second substrates;
   a gate line, a data line, and a thin film transistor on the first substrate;
   a colorless passivation layer on the thin film transistor and the gate line, wherein a data line contact hole is formed in the passivation layer, thereby exposing a portion of the data line;
   a first pixel electrode on the passivation layer;
   a common electrode on the second substrate; and
   a liquid crystal layer between the first and second substrates,
   wherein the data line contact hole provides for electrical interconnection between the first pixel electrode and an adjacent second pixel electrode for reducing effects of short circuiting between the first and second pixel electrodes.

8. A method of fabricating a liquid crystal display having first and second substrates, the method comprising the steps of:
   forming a gate electrode on the first substrate;
   forming a gate line on the gate electrode including the first substrate;
   forming a gate insulating layer on the gate line including the first substrate;
   forming an active layer on the gate insulating layer;
   forming a data line, a source electrode, and a drain electrode on the gate insulating layer, wherein the source and drain electrodes overlap the active layer;
   forming a colorless passivation layer to cover the source electrode, the drain electrode, the active layer, and the data line;

forming a data line contact hole in the passivation layer, wherein the data line contact hole exposes a portion of the data line while forming a pixel electrode on the passivation layer, wherein the data line contact hole is formed adjacent to a central edge portion of the pixel electrode.

9. The method of claim 8, wherein the pixel electrode is selected from a group consisting of indium tin oxide (ITO) and indium zinc oxide (IZO).

10. The method of claim 8, wherein the passivation layer includes an inorganic material.

11. The method of claim 10, wherein the inorganic material is silicon oxide ($SiO_2$).

12. The method of claim 8, wherein the passivation layer includes an organic material.

13. The method of claim 12, wherein the organic material is benzocyclobutene (BCB).

14. A method of fabricating a liquid crystal display having first and second substrates, the method comprising the steps of:

forming a gate electrode on the first substrate;

forming a gate line on the gate electrode including the first substrate;

forming a gate insulating layer on the gate line including the first substrate;

forming an active layer on the gate insulating layer;

forming a data line, a source electrode, and a drain electrode on the gate insulating layer, wherein the source and drain electrodes overlap the active layer;

forming a colorless passivation layer to cover the source electrode, the drain electrode, the active layer, and the data line;

forming a data line contact hole in the passivation layer, wherein the data line contact hole exposes a portion of the data line; and forming a first pixel electrode on the passivation layer;

wherein the data line contact hole provides for electrical interconnection between the first pixel electrode and an adjacent second pixel electrode for reducing effects of short circuiting between the first and second pixel electrodes.

* * * * *